United States Patent [19]

Hamrin, Jr. et al.

[11] 3,989,484
[45] Nov. 2, 1976

[54] SEPARATION OF ISOTOPES BY CYCLICAL PROCESSES

[75] Inventors: Charles E. Hamrin, Jr.; Kenny Weaver, both of Lexington, Ky.

[73] Assignee: The United States of America as represented by the United States Energy Research and Development Administration, Washington, D.C.

[22] Filed: Mar. 11, 1975

[21] Appl. No.: 557,566

[52] U.S. Cl. .................................... 55/58; 55/68
[51] Int. Cl.² .................................... B01D 53/04
[58] Field of Search ............... 55/16, 58, 62, 68, 74

[56] References Cited
UNITED STATES PATENTS

| | | | |
|---|---|---|---|
| 1,174,631 | 3/1916 | Snelling | 55/16 |
| 3,406,496 | 10/1968 | Betteridge et al. | 55/58 |
| 3,494,100 | 2/1970 | Hope | 55/58 X |
| 3,630,690 | 12/1971 | Coppola | 55/16 X |
| 3,659,399 | 5/1972 | Kauer, Jr. et al. | 55/62 X |
| 3,720,042 | 3/1973 | Simonet | 55/62 X |
| 3,788,037 | 1/1974 | Shell et al. | 55/58 |

*Primary Examiner*—Thomas G. Wyse
*Assistant Examiner*—Robert H. Spitzer
*Attorney, Agent, or Firm*—Dean E. Carlson; D. S. Zachry; John B. Hardaway

[57] ABSTRACT

Various isotopes of hydrogen are separated by a cyclic sorption process in which a gas stream containing the isotopes is periodically passed through a high pressure column containing a palladium sorbent. A portion of the product from the high pressure column is passed through a second column at lower pressure to act as a purge. Before the sorbent in the high pressure column becomes saturated, the sequence is reversed with the stream flowing through the former low-pressure column now at high pressure, and a portion of the product purging the former high pressure column now at low pressure. The sequence is continued in cyclic manner with the product being enriched in a particular isotope.

5 Claims, 7 Drawing Figures

SEPARATION OF ISOTOPES BY CYCLICAL PROCESSES

BACKGROUND OF THE INVENTION

This invention was made in the course of, or under, a contract with the United States Atomic Energy Commission. It relates generally to a process for separating the isotopes of hydrogen and more particularly to a cyclic sorption process for separating isotopes of hydrogen.

In the past various processes have been used for separating the isotopes of hydrogen. In general, different processes are used for particular concentration ranges. Deuterium has a natural abundance of about 0.015% in the hydrogen element; whereas heavy water reactors use deuterium oxide enriched to about 99.7%. Thus essentially the entire spectrum of deuterium concentrations is passed through in the enrichment process.

An exchange process utilizing the different exchange rates of hydrogen and deuterium between water and hydrogen sulfide is normally used to bring the deuterium concentration up to an intermediate level. At this point, catalytic steam hydrogen exchange and distillation are used to further increase the deuterium concentration. The final concentration of deuterium is achieved by electrolysis.

Hydrogen and deuterium have also been separated by using a column packed with a palladium sorbent. Palladium has a higher sorptive capacity for hydrogen than for deuterium. Theoretically, by making a column of sufficient length, elemental hydrogen could be introduced into one end of a column and deuterium extracted from the other end of the column. However, such a process would be short lived because the column would quickly become saturated causing no further separation to occur.

Gas separations not involving any isotopic separations have been carried out using a process generally known as heatless adsorption. U.S. Pat. Nos. 2,944,627 and 3,082,166 describe such a process as it applies to drying volatile liquids. This process involves the use of two columns packed with a desiccant. The wet stream of volatile liquid is passed through the columns one at a time at high pressure with a portion of the product being used to desorb the water on the other column which is at low pressure.

SUMMARY OF THE INVENTION

It is thus an object of this invention to provide a novel process for separating the isotopes of hydrogen.

It is a further object of this invention to provide a process for continuously separating hydrogen isotopes.

It is a still further object of this invention to provide a continuous process for separating hydrogen isotopes which is useful at essentially any level of deuterium enrichment.

These as well as other objects are accomplished by introducing a gas stream containing hydrogen isotopes into a first column at a relatively high pressure containing a palladium sorbent and removing a product enriched in one or more hydrogen isotopes from the column. A second column also containing a palladium sorbent is purged at a relatively low pressure by passing a portion of the product stream from the first column through the second column. Prior to the time at which the high pressure column becomes saturated, the sequence is switched by introducing the feed stream into the former low pressure column and raising the pressure therein and purging the former high pressure column at low pressure with a portion of the product stream. The process is continued by cyclically switching columns on a periodic basis.

DETAILED DESCRIPTION

According to this invention it has been found that hydrogen isotopes can be separated by cyclically passing a stream containing hydrogen isotopes sequentially through two columns packed with a palladium sorbent. The packed columns are alternately maintained at high and low pressures during the course of a process cycle. A cycle of the process thus comprises four sequential steps which will be more fully described below. The cycle of the process will be described as if the process were at some point past the initial startup cycle since the first cycle is carried out in a slightly different manner from the remainder of the steps. The process as described herein is with reference to hydrogen (mass 1) and deuterium. However, it is to be understood that the process is equally applicable to separating hydrogen (mass 1) and tritium or to separating deuterium and tritium.

Figure 1:
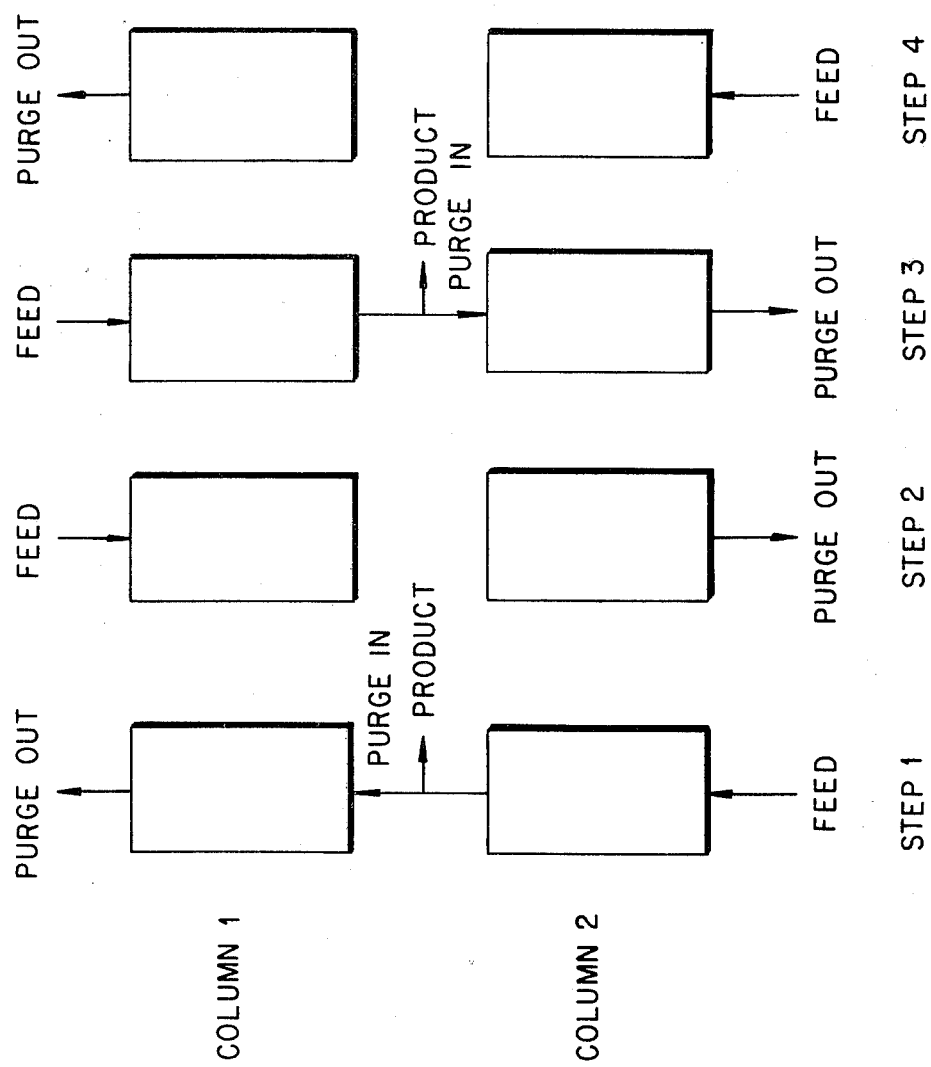
FIG. 1 is a representation of the four steps that occur in one cycle of the process of this invention.

As is depicted in FIG. 1 of the drawings, step 1 of a cycle comprises introducing the feed gas into one of the columns, column 2, at a relatively high pressure. Palladium within the column selectively sorbs hydrogen (mass 1) such that the stream passing through column 2 is enriched in deuterium as it passes through the column and thus a stream enriched in deuterium exits from the other end of the column as a product stream. A portion of the product stream is passed into column 1 which is at low pressure. The remaining portion of the product stream is passed on to storage. Column 1, which was previously at high pressure and thus near saturation is purged at the low pressure by the portion of the product stream passing through. The exiting purge stream from column 1 has a lower concentration of deuterium than the feed stream and is thus either disposed of or stored.

Step 2 is begun prior to the time when column 2 is at or near saturation, i.e., the product concentration approaches that of the feed. Step 2 comprises releasing the pressure on column 2 and allowing it to drop to the pressure of the low pressure and increasing the pressure in column 1 to the high pressure level. This step is relatively short lived in comparison to step 1. The release of pressure on the high pressure column is referred to as blowdown.

Step 3 is practically identical to step 1 with the exception of the roles of column 1 and column 2 being switched. Feed flows into column 1 at high pressure while product enriched in deuterium flows out. A portion of the product from column 1 is used as a purge for column 2, with the remainder of the product passing on to storage.

Step 4 is similar to step 2 with the roles of columns 1 and 2 reversed. Column 1, which was at high pressure, is reduced to low pressure by venting until the low pressure is reached. Column 1, which was being purged at low pressure, is increased to the high pressure of the feed. At this point a second cycle is begun by repeating step 1.

The initial step of the process is to equilibrate both columns with the feed at the pressure which the column will be operating. Thus prior to step 1, column 1 is equilibrated with the feed at low pressure, while column 2 is equilibrated with the feed at high pressure. The time used for equilibration is generally about the time required for ½ cycle.

While metals other than palladium could be used as a sorbent for the process, palladium has been found to possess the best sorption characteristics of any metal. The term sorption as used herein with reference to the uptake of hydrogen by palladium is meant to include the phenomena of adsorption, absorption, and chemisorption. Palladium has been found to possess unexpected characteristics as it relates to the separation of the isotopes by the process of this invention. Separation is achieved first by the differences in sorptive capacity of palladium for the various isotopes at a given pressure. Thus at the pressure involved, palladium has a greater capacity for hydrogen (mass 1) than for deuterium and in turn than for tritium. Separation is then achieved by the column sorbing proportionately more hydrogen (mass 1) than deuterium and tritium if present. But, unpredictably, separation is also achieved by a second factor. The proportion of hydrogen sorbed to deuterium sorbed at high and low pressure is not constant but decreases upon going to low pressure. Thus during the low pressure purge the ratio of hydrogen to deuterium released is greater than the ratio of hydrogen to deuterium sorbed during the high pressure sorption step. Thus after being purged the column will contain more deuterium at the beginning of the next high pressure sorption step than it did at the beginning of the previous high pressure sorption step. The column sorbs substantially the same amount of hydrogen during the high pressure sorption step as it did during the previous similar step but less deuterium since the column contains more deuterium to start with. This leads to a higher enrichment on successive high pressure sorption steps. The higher enrichment leads to a further increase in the amount of deuterium retained on the column after the purge. The degree of enrichment thus increases on each successive cycle until a point is reached at which an equilibrium is achieved and the degree of enrichment remains substantially constant.

Basically any high surface area palladium packing may be used in the process of this invention. It is preferred, however, to use activated alumina coated with palladium. The weight percent palladium in the particles should be within the range of about 15 to 30 percent with about 20 percent being an optimum.

The cycle time used in the process is dependent upon the feed flow rate, volume of the column, and the packing. A half cycle must be shorter in time than the time required for the column to become saturated with elemental hydrogen. This time can easily be determined by flowing the feed through the column at the expected pressure and flow rate while measuring the composition of the product. When the product becomes of the same composition as the feed, breakthrough has occurred and the column is saturated. The maximum time per half cycle must then be shorter than the time required for breakthrough. Essentially any half cycle time short of the breakthrough time is operable.

To minimize blowdown losses long cycle times are desirable; however, for high product concentration, the half cycle time must be less than the breakthrough time. Therefore, optimum half cycle times are about 90 to 95 percent of breakthrough times.

The process requires that one column be operated at low pressure while the other is at high pressure. The main factor in determining the high pressure is the pressure at which the feed gas is available. Sorption will occur at virtually any pressure. However, it is preferred to carry out the process with both columns above atmospheric pressure as a matter of simplicity. The optimum pressure difference between the high pressure and low pressure columns is determined by both the adsorption capacity of the palladium and the variation of the isotope separation factor as a function of pressure. Also, losses due to blowdown and purging are related to the pressure differential. The high pressure column is thus preferably operated at pressure within the range of 80 to 300 psig while the low pressure column is preferably operated within the range of 5 to 10 psig.

A critical parameter of the process of this invention is the ratio of volume flow rate of purge stream to that of the feed stream. This ratio for the sake of simplicity is referred to as $\gamma$. It should be noted that purge stream volume is at low pressure while the feed stream volume is at high pressure, so that the ratio, $\gamma$, reflects only a volume ratio and not a molar ratio. The ratio, $\gamma$, is determined by the proportion of the product stream which is diverted to act as a purge on the low pressure column. As will be apparent from the examples which follow, enrichment is achieved when $\gamma$ is zero. However, the degree of enrichment increases as $\gamma$ increases. From observing FIG. 4, it can be seen that when $\gamma$ is zero, the enrichment increases on successive cycles up to a point and then decreases upon successive cycles until a constant enrichment is reached. This increasing and then decreasing enrichment type behavior continues as $\gamma$ increases up to a critical value. At the critical value of $\gamma$, enrichment will increase on each successive cycle until a constant enrichment is achieved without a decrease in enrichment in the interim. It has been found that the critical value of $\gamma$ is within the range of 1.0 to 1.2. As $\gamma$ is increased, the degree of enrichment in the product continues to increase. However, the amount of product decreases as $\gamma$ is increased. The selection of a particular value of $\gamma$ is thus a matter of discretion dependent upon the particular results which are desired.

It is thus readily apparent that the process of this invention has substantial versatility as far as selection of a desired degree of enrichment is concerned. The process may also be carried out in stages by using the product of one stage as the feed for the next stage to achieve higher degrees of enrichment.

Figure 2:
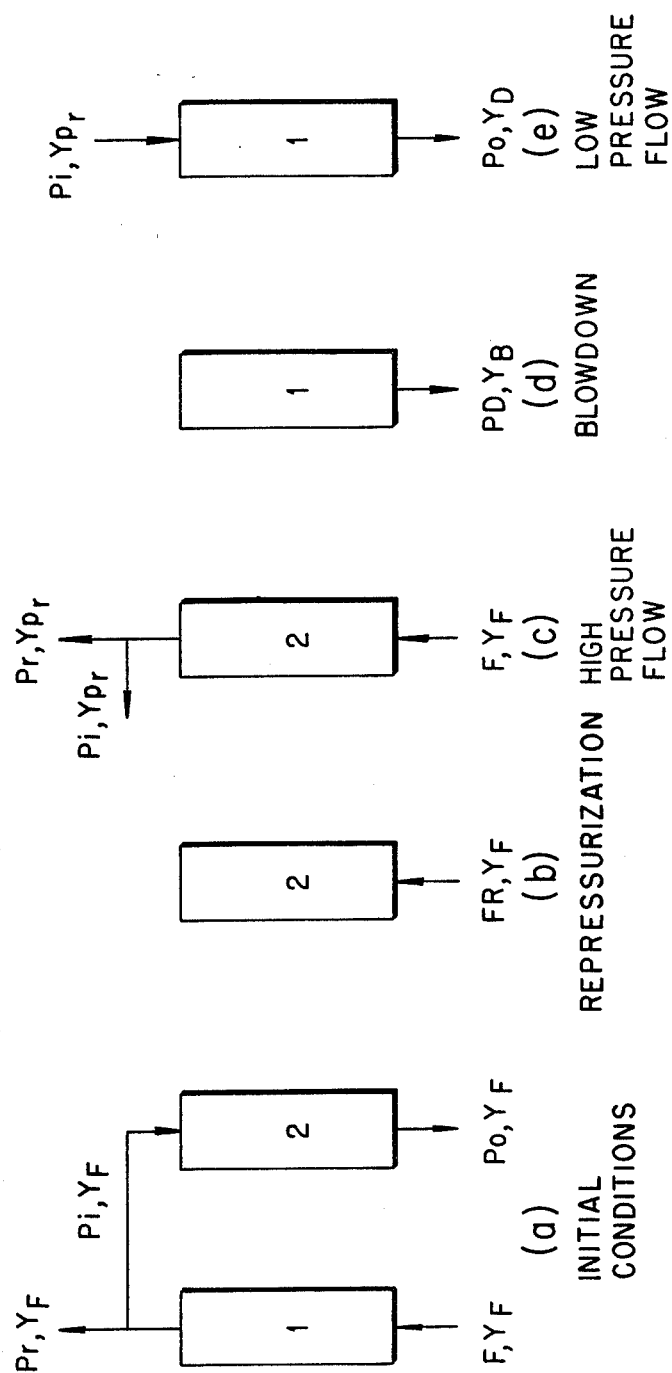
FIG. 2 illustrates the stream flows and compositions at different portions of the process cycle of this invention.

A practical method of estimating the performance of the process according to this invention for a particular set of parameters is to evaluate a series of mass balances around columns 1 and 2 for each step. All mass balances are written with respect to the least adsorbed component, i.e. deuterium. FIG. 2 illustrates the conditions present in the mass balance. Initially column 1 is in equilibrium with the feed at high pressure and column 2 is in equilibrium with the feed at low pressure. All streams in the system have a composition equal to that of the feed. In this case column 2 contains $V_{S,L}(X_{F,L})+V_{G,L}(Y_F)$ SCC of the least adsorbed component and column 1 contains $V_{S,H}(X_{F,H})+V_{G,H}(Y_F)$ SCC of the least adsorbed component where $V_S$ and $V_G$ are the total capacities of the solid phase and gas phase respectively. The fraction of least adsorbed component present in the solid phase, X, is related to the fraction in the gas phase, Y, by the following equations:

$$X_H = \frac{Y}{K_H + (1-K_H)Y} \tag{1}$$

and $$X_L = \frac{Y}{K_L + (1-K_L)Y} \tag{2}$$

where $K$ is the separation factor and the subscripts $H$ and $L$ refer to high and low pressure.

The mass balance around column 2 during repressurization is (see FIG. 2b):

$$FR(Y_F) = V_{S,H}(X_{A,1}) + V_{G,H}(Y_{A,1}) - [V_{S,L}(X_{F,L}) + V_{G,L}(Y_F)] \tag{3}$$

where $FR$ is the amount of gas needed to repressurize the column and $X_A$, and $Y_A$, are the resulting equilibrium concentrations in the solid and gas phases. The numerical subscripts refer to the half cycle number.

Column 2 then undergoes high pressure flow (see FIG. 2c) and the mass balance is:

$$F(Y_F) - (Pr + Pi) Y_{Pr,1} = V_{S,H}(X_{F,A}) + V_{G,H}(Y_F) - [V_{S,H}(X_{A,1}) + V_{G,H}(Y_{A,1})] \tag{4}$$

where $F$, $Pr$, and $Pi$ are the feed, product and purge flowrates respectively, and $Y_{Pr,1}$ is the product composition for the first half cycle. By assuming the cycle time is just short of breakthrough, the solid will be in equilibrium with the feed gas after high pressure flow.

As column 2 was repressurizing column 1 was undergoing blowdown (see FIG. 2d). The mass balance for blowdown is:

$$-PD(Y_B) = V_{S,L}(X_R) + V_{G,L}(Y_R) - [V_{S,H}(X_{F,H}) + V_{G,H}(Y_F)] \tag{5}$$

where $PD$ is the amount of gas out of column 1 during blowdown with a concentration of $Y_B$, and $X_R$ and $Y_R$ are the resulting equilibrium concentrations in the solid and gas phases.

Column 1 then undergoes low pressure flow (see FIG. 2e). The mass balance is:

$$Pi(Y_{Pr,1}) - Po(Y_{D,1}) = V_{S,L}(X_{D,1}) + V_{G,L}(Y_{D,1}) - [V_{S,L}(X_R) + V_{G,L}(Y_R)] \tag{6}$$

where $Po$ is the purge out during low pressure flow and $X_D$ and $Y_D$ are the resulting concentrations in the solid and gas phases.

The repressurization equation for the second half cycle is:

$$FR(Y_F) = V_{S,H}(X_{A,2}) + V_{G,H}(Y_{A,2}) - [V_{S,L}(X_{D,1}) + V_{G,L}(Y_{D,1})] \tag{7}$$

and so on. There will be four equations, corresponding to each step, for each half cycle.

Equations 3, 4, 5 and 6 contain five unknowns, $Y_{Pr}$, $Y_A$, $Y_R$, $Y_D$, and $Y_B$. Therefore, another assumption must be made. When $\gamma$ is equal to the critical value of 1.0 no further enrichment of the feed occurs after the first half cycle, i.e., $Y_{Pr,1} = Y_{Pr,1} = Y_{Pr,n}$. From equations 3 and 4 the product composition for the first half cycle is:

$$Y_{Pr,1} = \frac{(FR+F)Y_F+[V_{S,L}(X_{F,L})+V_{G,L}(Y_F)]-V_{S,H}(X_{F,H})-V_{G,H}(Y_F)}{PR + Pi} \tag{8}$$

and for the nth half cycle the product composition is:

$$Y_{Pr,n} = \frac{(FR+F)Y_F-[V_{S,L}(X_{F,L})+V_{G,L}(Y_F)]+V_{S,L}(X_{D,n-1})+V_{G,L}(Y_{D,n-1})}{PR + Pi} \tag{9}$$

Therefore, when $\gamma = 1.0$, the value of $Y_D$ must be equal to $Y_F$. The value of $Y_B$ can now be found by the addition of equations 5 and 6. Substituting in $Y_D$ for $Y_F$ and the purge flowrate corresponding to $\gamma = 1.0$, P$ur$, gives:

$$Y_B = \frac{Pur(Y_{Pr,1}-Y_F)-[V_{S,L}(X_{F,L})+V_{G,L}(Y_F)]+V_{S,H}(X_{F,H})+V_{G,H}(Y_F)}{PD} \tag{10}$$

The value of $Y_B$ is not dependent upon $\gamma$ or the half cycle number. Therefore, equations 3, 4, 5 and 6 can be solved for $Y_{Pr,1}$ and $Y_{D,1}$. Similarly, the four equations corresponding to the second half cycle can be solved for $Y_{Pr,2}$ and $Y_{D,2}$ and so on up to the nth half cycle. Thus, the product composition of the nth half cycle, given in equation 9, can be calculated by solving the series of four equations for each half cycle successively. The composition of the total purge, $Y_T$, can be found in a similar manner. For the nth half cycle:

$$Y_{T,n} = \frac{PD(Y_B) + Po(Y_{D,n})}{PD + Po} \tag{11}$$

Figure 3:
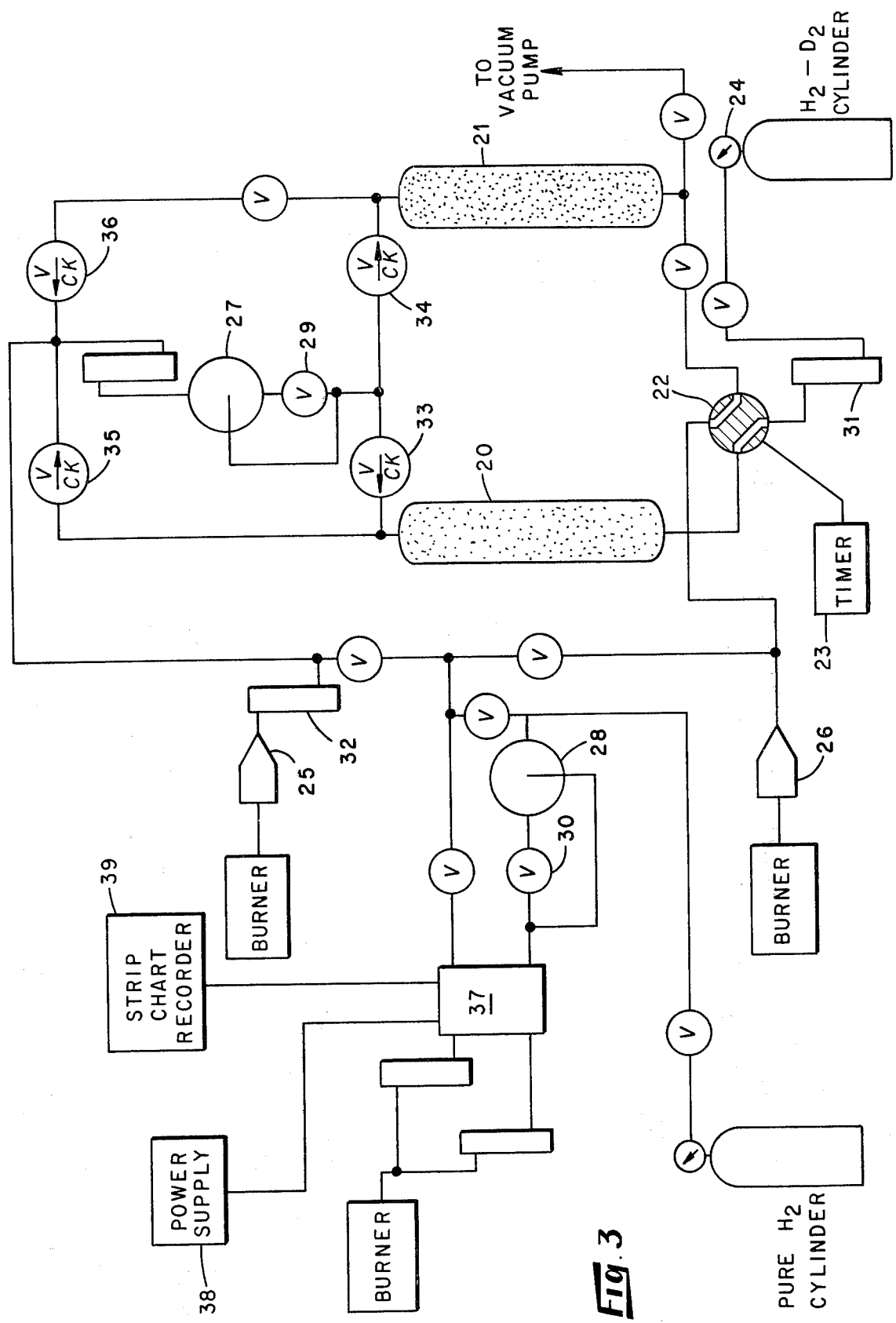
FIG. 3 is a schematic drawing of an apparatus used to separate hydrogen isotopes by the process of this invention.

Having generally described the process of this invention, examples will now be given as to the actual operation of the process and the apparatus used therein. The apparatus shown in FIG. 3 was used in the examples which follow. Two columns, 20 and 21, made of brass tubing having an internal diameter of 0.940 cm and a length of 87.6 cm, containing 95.00 grams of a packing consisting essentially of 25 weight percent palladium deposited on 40 to 80 mesh alumina particles were used. A column void fraction of 0.60 was determined from water displacement measurements.

A 4-way solenoid valve 22 (Valcor Engineering Corporation, Model No. SV-1000was controlled by a cam timer 23 and alternately directed feed into one column and purge out of the other. The timer 23 (Industrial Timer Corporation, Model CM-5) allowed cycle times ranging from 120 to 1080 seconds. Pressure in the high pressure side was maintained by a Matheson cylinder regulator 24 (Model No. 9-350) and Masoneilan back pressure regulators 25 and 26 (Model No. 77-7) were used to maintain the proper pressure in the low pressure side.

The feed gas was of a known hydrogen-deuterium mixture containing 5.5% deuterium with the balance of both being hydrogen (99.999% minimum purity).

Constant differential flow controllers 27 and 28 (Moore Products Co., Model Nos. 63 BU and 63 BD) were used in conjunction with Nupro Double Pattern Fine Metering Valves 29 and 30 (No. B-4MD) to keep the purge and product flowrates constant. Fisher-Porter flowmeters 31 and 32 (Model No. 10A3565A) were used to measure flowrates of the feed, purge, and product streams as well as flows to the thermal conductivity detector. They were calibrated by means of a bubblemeter and a stopwatch. Four Nupro check valves, 33, 34, 35, and 36, (Model No. B-4C-1/3), were used to prohibit the pressure from equalizing in the two columns. Standard ¼ inch brass having an internal diameter of 0.305 cm, was used throughout the system.

For continuous flow experiments (separation runs and breakthrough runs), a Gow Mac thermal conductivity detector 37 (Model No. 10-952) fitted with four WX tungsten-rhenium, filaments was used for measuring the deuterium content of the product stream. The detector 37 was insulated against any normal external changes by a layer of "Styrofoam."

Pure hydrogen, 99.999% minimum purity, was passed through the reference side of the detector. A constant current of 250 ma was supplied by a Gow Mac Power Supply Unit (Model No. 40-001), 38. A Honeywell electronic 19 stripchart recorder 39 made a permanent record of the product gas composition.

Prior to each run column 20 was saturated with feed gas at 114.7 psia and column 21 was saturated at 19.7 psia. This was accomplished by allowing feed to pass up through column 20 at a rate of 250 SCCM. A portion of this product, 55 SCCM, was directed to the thermal conductivity detector for analysis and the rest was used as a purge of column 21. Approximately 20 minutes were required to reach steady state. The feed, product and purge flowrates were then adjusted to run conditions. The run was started by activating the timer 23 which controlled the 4-way solenoid valve 22. At half cycle intervals this valve alternately directed feed into one column while allowing purge to escape from the other. The product composition was monitored for the entire run.

Figure 5:
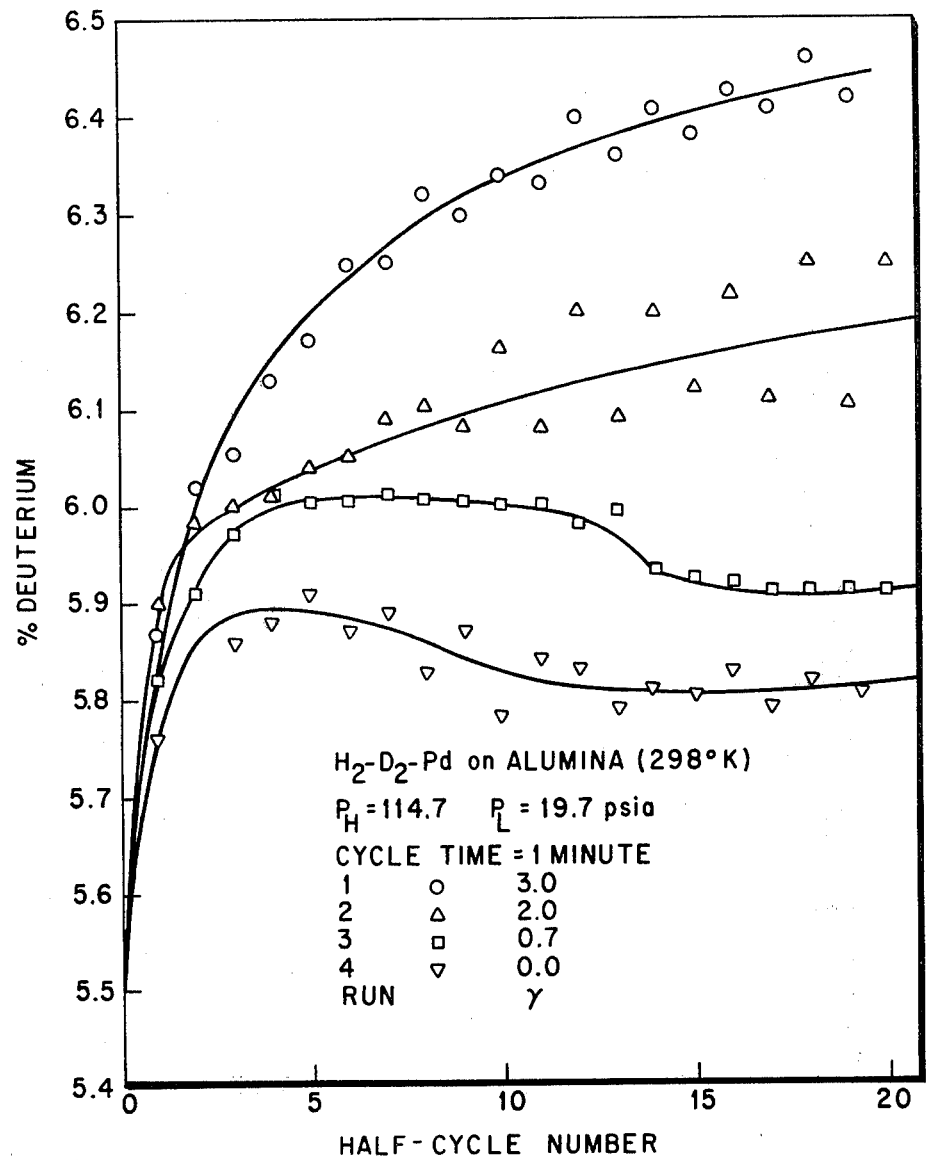
FIG. 5 shows deuterium concentration of the product as a function of half-cycle number for a cycle time of one minute. Each curve is for a different purge to feed ratio.
Figure 6:
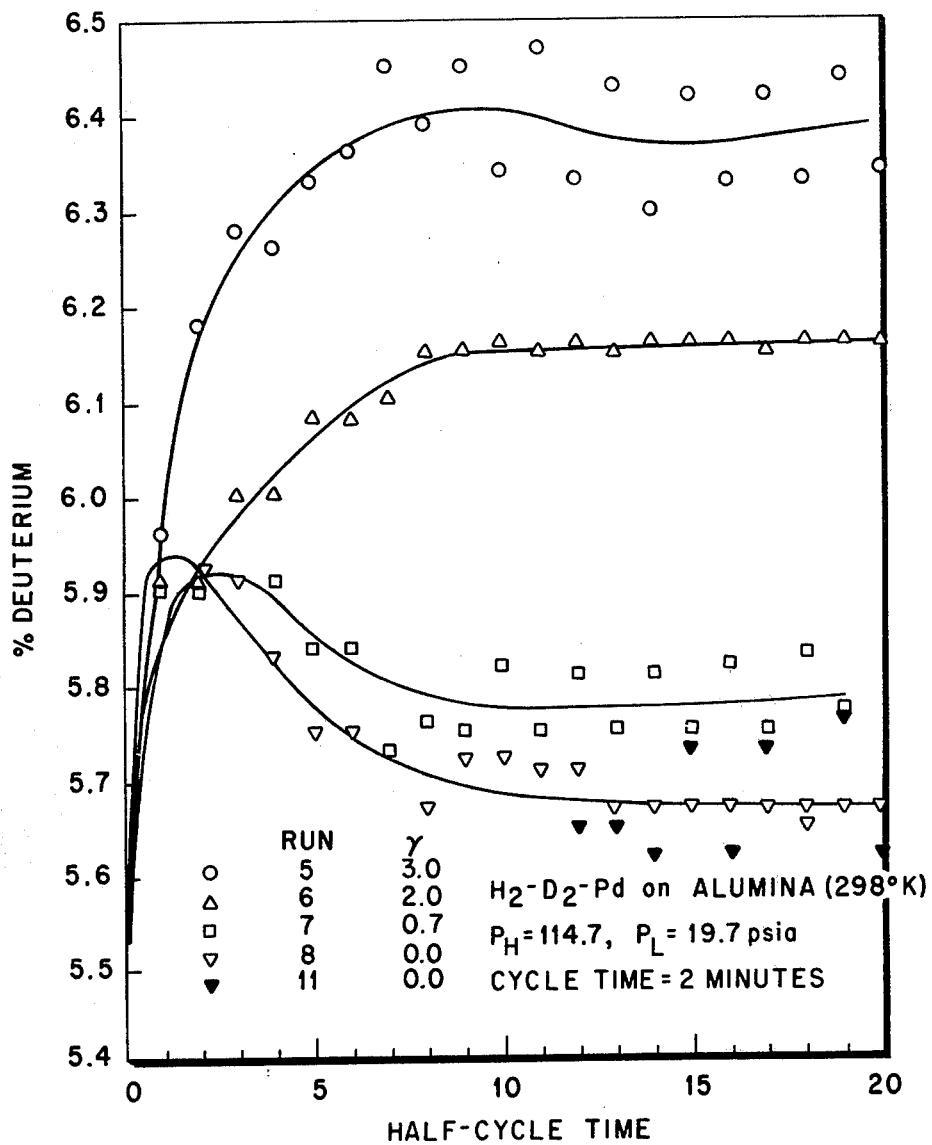
FIG. 6 is similar to FIG. 5 except the cycle time is two minutes.
Figure 7:
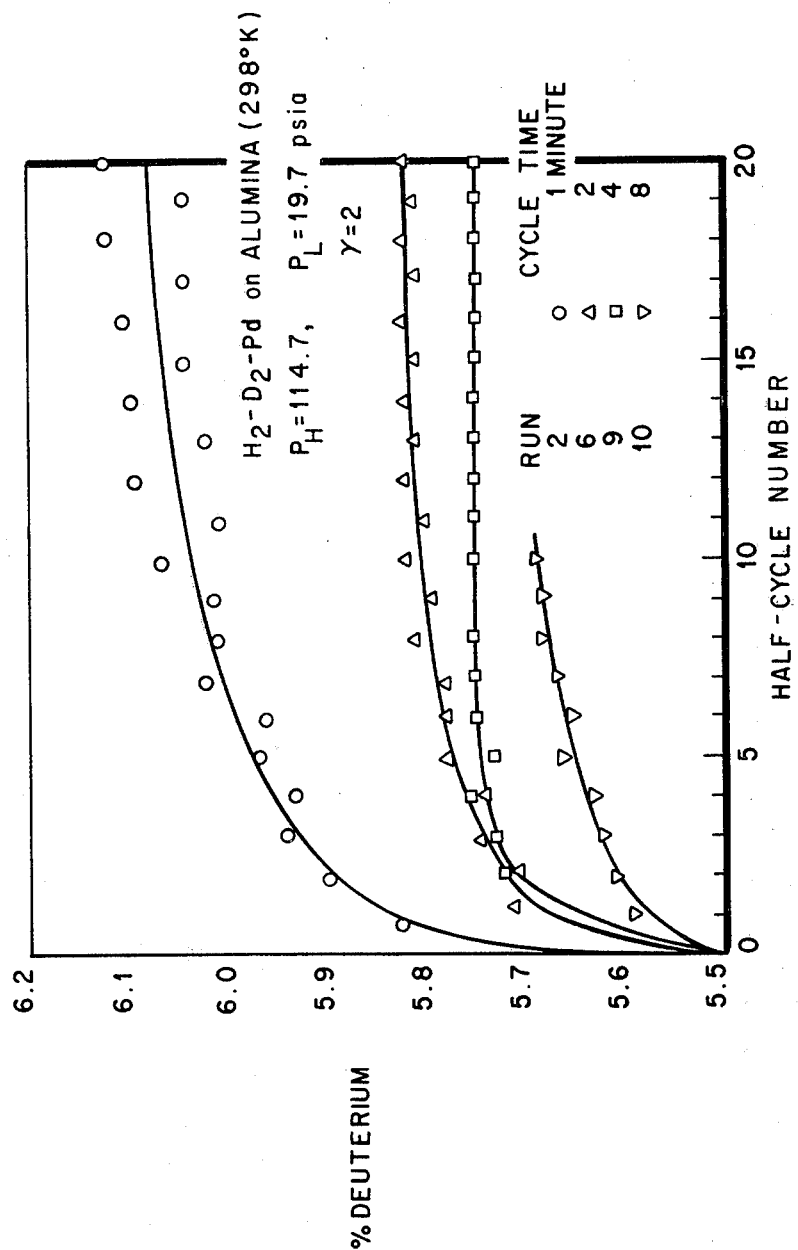
FIG. 7 shows deuterium concentration of the product as a function of half-cycle number for a purge to feed ratio of 2. Each curve is for a different cycle time.

The results and conditions used for the various runs are shown in FIGS. 5, 6, and 7. Results from these runs show that a significant separation of hydrogen isotopes can be achieved in a continuous manner and that the magnitude of this separation depends on the purge to feed ratio, $\gamma$, and the cycle time. In all runs, the feed remained at a constant flowrate of 290.0 SCCM and a composition of 5.5% deuterium and 94.5 hydrogen. The temperature remained constant at 298° K and no heat effects were observed. The cycle times used were 1, 2, 4 and 8 minutes while the purge to feed ratios were 0, 0.7, 2.0 and 3.0. All results are reported in terms of $Y_{Pr}$, the mole fraction or % of deuterium in the product stream.

Figure 4:
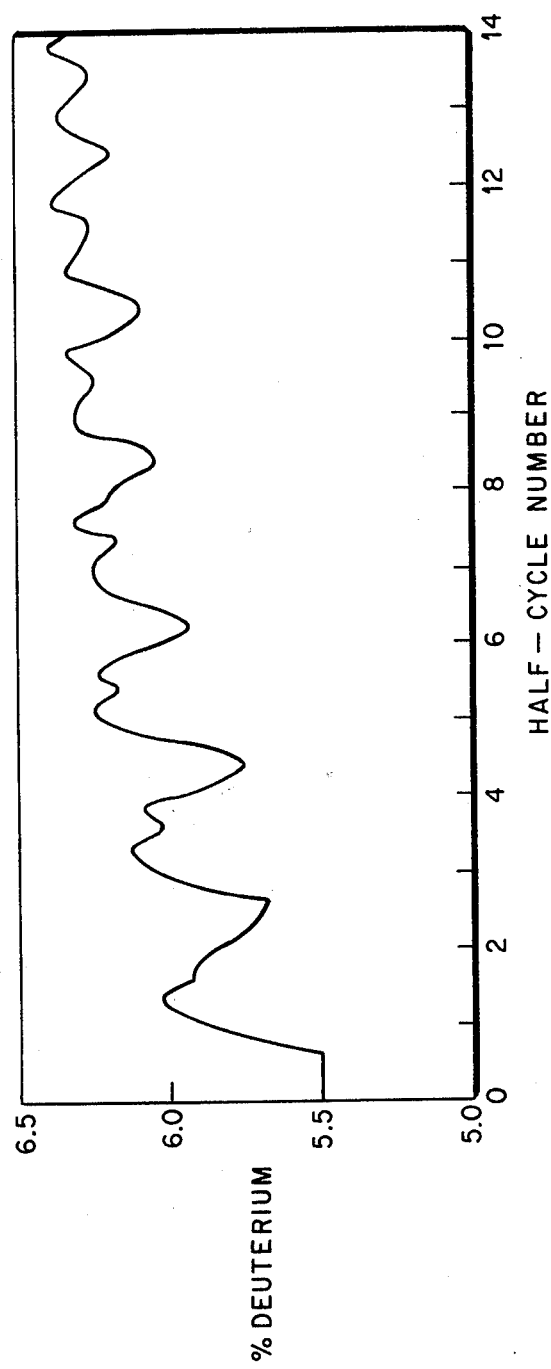
FIG. 4 graphically depicts the product composition versus half-cycle number produced by the process of this invention.

The concentration vs half cycle trace for the first 14 half cycles of run 1 is given in FIG. 4. The effect of varying $\gamma$ is shown in FIGS. 5 and 6 for cycle times of 1 and 2 minutes respectively. Maximum values of the concentrations are plotted since they can be quickly and accurately evaluated. It is apparent that as $\gamma$ increases the concentration of deuterium in the product also increases. However, it should be kept in mind that the quantity of product decreases for larger values of $\gamma$. From these data the critical value of $\gamma$ is within the range of 1.0 to 1.2.

Runs 2, 6, 9 and 10 are compared in FIG. 7 to show the effect of varying cycle time while keeping the purge to feed ratio constant at 2.0. To ensure a valid comparison, the average concentration of the product streams were used. This was necessary because for cycle times of 2, 4 and 8 minutes breakthrough of feed occurred during each half cycle, thus lowering the overall composition and making the maximum values meaningless for accurate comparison. It can be seen that as the cycle time decreases, the deuterium concentration increases. However, the large differences can be attributed to the fact that breakthrough occurred in Runs 6, 9 and 10. This illustrates the importance of keeping the half cycle time at less than the breakthrough time.

For these runs, the percentage of feed resulting in product ranged from 15 to 51% which is rather small. The reason for this is that the most adsorbable component, hydrogen, was present in large excess, 94.5%, and a relatively short time is needed to saturate the solid. Thus, a short cycle time is needed to prevent breakthrough. This indicates that the process of this invention is best adapted to enriching a deuterium containing relatively small amounts of hydrogen, e.g., 10% or less. The cycle time could thus be increased to give a higher percentage of product. This is particularly important in a staged process where the product of one sorber acts as the feed of another.

It is thus seen that a novel and continuous process for separating hydrogen isotopes is provided by the process of this invention. Various modifications will of course be apparent to those skilled in the art. Such modifications, however, may be made without departing from the spirit and scope of the appended claims.

What is claimed is:

1. A method for separating isotopes of hydrogen mass 1 and deuterium, comprising the steps of:
    passing a gaseous feed stream containing said isotopes through a first column packed with a palladium sorbent;
    removing a product stream enriched in deuterium from said first column;
    dividing said product stream into two portions;
    directing a first portion of said divided product stream to a second column containing a palladium sorbent and maintained at a lower pressure than said first column to act as a purge stream on said second column;
    retaining the second portion of said product stream as a product;

continuing said step of passing for a period of time less than that required to saturate said first column;

switching the roles of said first and second columns by introducing said feed stream into said second column and passing a portion of the product stream from said second column through said first column at a lower pressure than said second column;

continuing said process in a cyclic manner by switching the role of said first and second columns after said period of time; and maintaining during said step of continuing the volume ratio of the purge stream flow rate to the feed stream flow rate at a value greater than the value at which the degree of enrichment increases on each successive cycle until a constant degree of enrichment is achieved without a decrease in the degree of enrichment in the interim.

2. The method according to claim 1 wherein the pressure of the column used in said step of passing is within the range of 80 to 300 psig and the pressure of the other column used in said step of directing is within the range of 5 to 10 psig.

3. The method according to claim 1 wherein the volume ratio of the gas exiting the column being purged during said step of directing to the feed gas used in said step of passing is within the range of 1.0 to 1.4.

4. The method according to claim 1 wherein said palladium sorbent is activated alumina coated with 15 to 30 weight percent palladium.

5. The method according to claim 1 wherein said feed gas consists essentially of hydrogen and deuterium.

* * * * *